No. 732,376. PATENTED JUNE 30, 1903.
A. R. ROGERS.
FISH CUTTING AND CLEANING APPARATUS.
APPLICATION FILED AUG. 1, 1901.
NO MODEL. 4 SHEETS—SHEET 1.
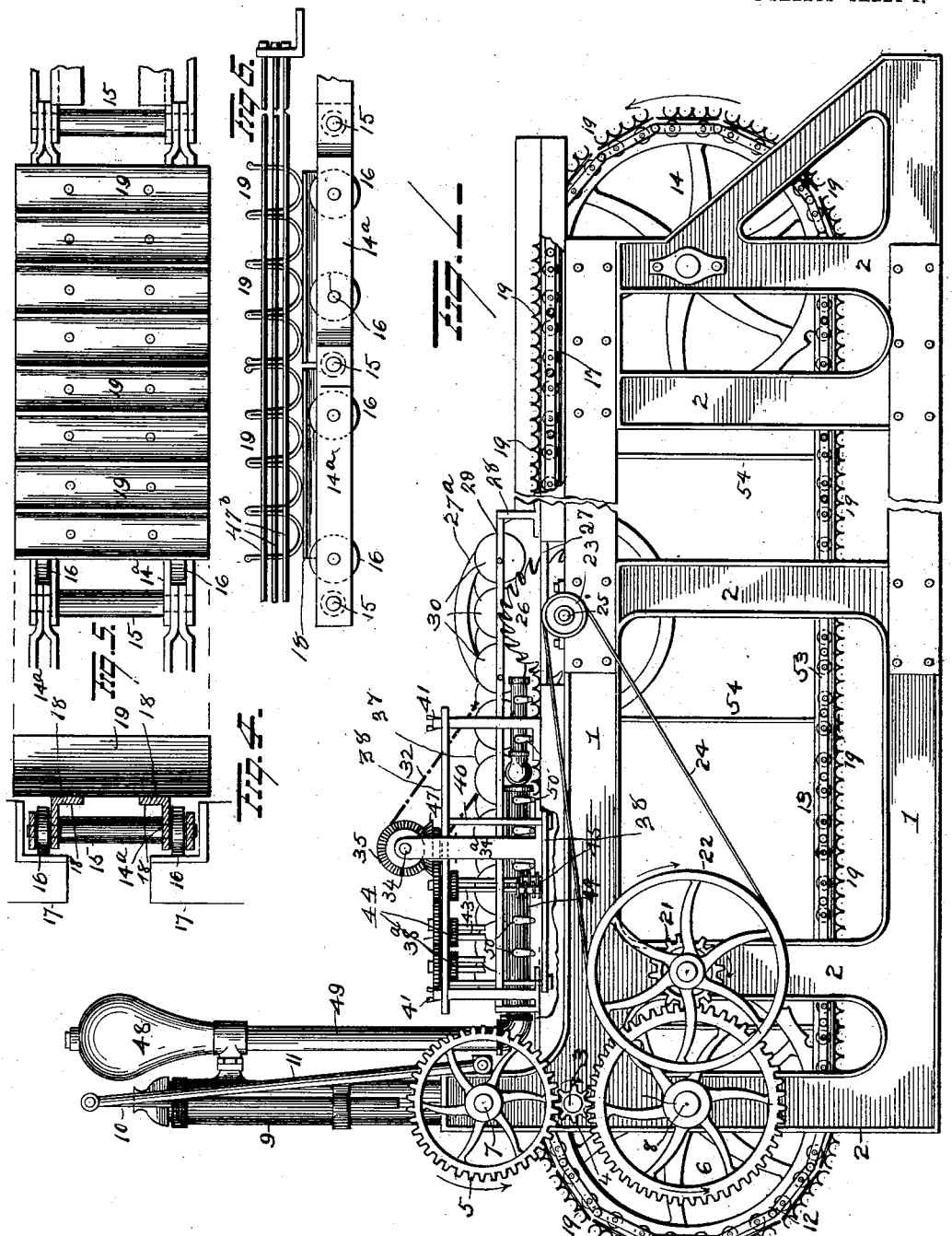
WITNESSES
E. J. Nottingham
G. F. Downing
INVENTOR
A. R. Rogers
By H. A. Seymour
Attorney No. 732,376. PATENTED JUNE 30, 1903.
A. R. ROGERS.
FISH CUTTING AND CLEANING APPARATUS.
APPLICATION FILED AUG. 1, 1901.
NO MODEL. 4 SHEETS—SHEET 2.
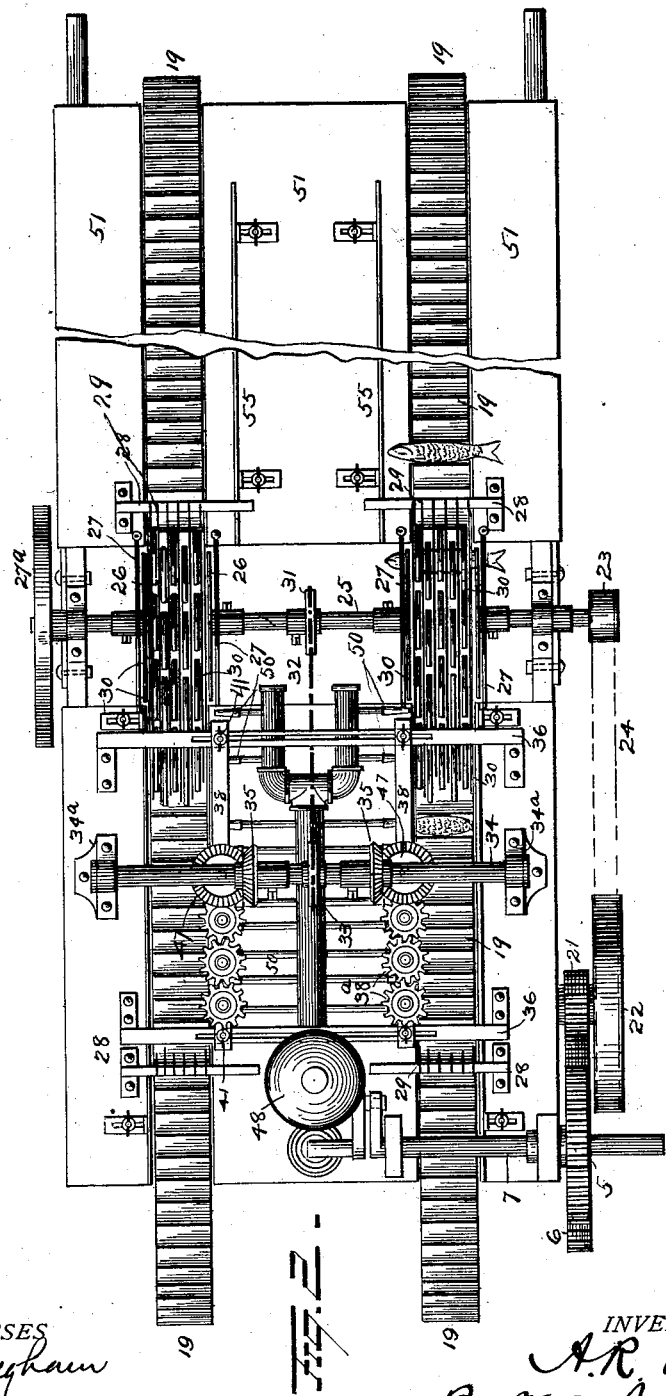

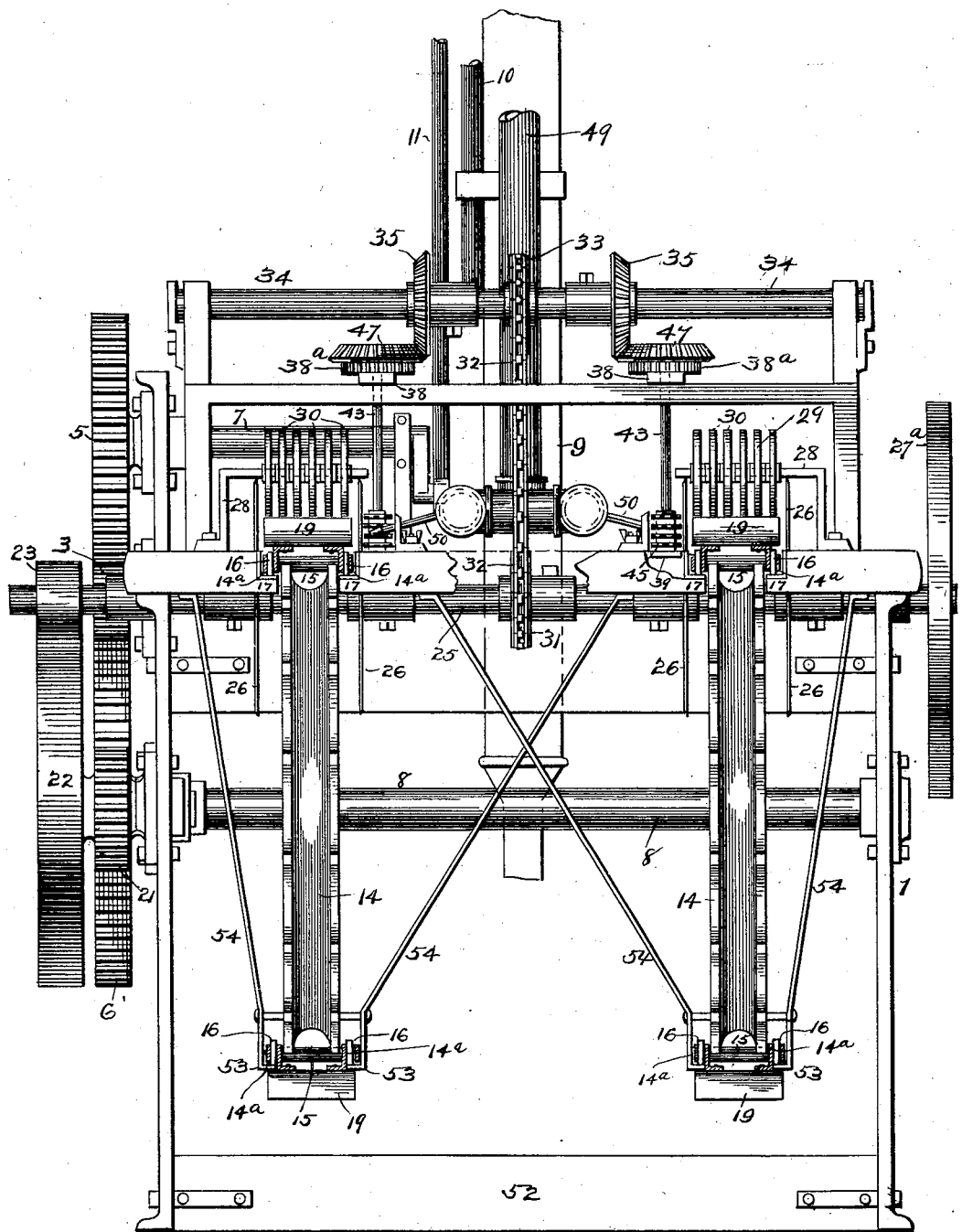

No. 732,376. PATENTED JUNE 30, 1903.
A. R. ROGERS.
FISH CUTTING AND CLEANING APPARATUS.
APPLICATION FILED AUG. 1, 1901.
NO MODEL. 4 SHEETS—SHEET 4.
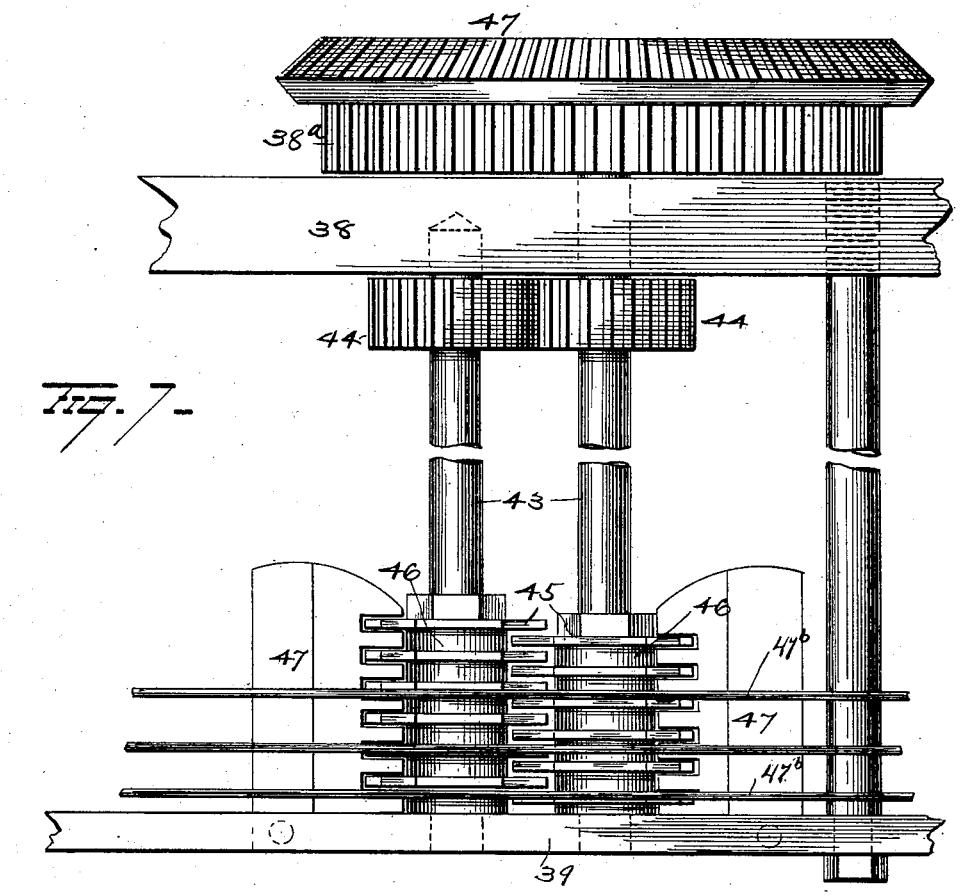
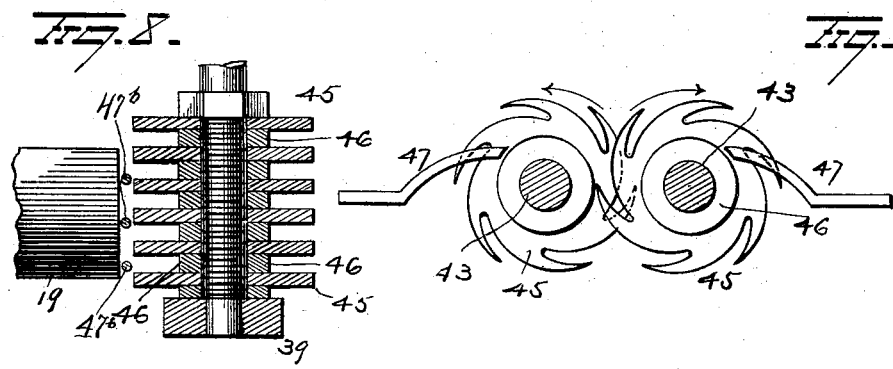

No. 732,376. Patented June 30, 1903.

UNITED STATES PATENT OFFICE.

ARTHUR R. ROGERS, OF JONESPORT, MAINE.

FISH CUTTING AND CLEANING APPARATUS.

SPECIFICATION forming part of Letters Patent No. 732,376, dated June 30, 1903.

Application filed August 1, 1901. Serial No. 70,538. (No model.)

*To all whom it may concern:*

Be it known that I, ARTHUR R. ROGERS, a resident of Jonesport, in the county of Washington and State of Maine, have invented certain new and useful Improvements in Fish Cutting and Cleaning Apparatus; and I do hereby declare the following to be a full, clear, and exact description of the invention, such as will enable others skilled in the art to which it appertains to make and use the same.

My invention relates to an improvement in apparatus for cutting and cleaning fish, the object of the invention being to provide an apparatus of this character which will rapidly cut off the heads and tails of the fish and remove their entrails and also wash the fish.

A further object is to provide improvements of this character which will be entirely automatic in their operation, preparing a large number of fish in a short space of time and greatly reducing the cost of such preparation for the market.

With these objects in view the invention consists in certain novel features of construction and combinations and arrangements of parts, as will be more fully hereinafter described, and pointed out in the claims.

In the accompanying drawings, Figure 1 is a view in side elevation, partly broken away, illustrating my improvements. Fig. 2 is a plan view. Fig. 3 is an end view, and Figs. 4, 5, and 6 are detail views illustrating the carrier. Figs. 7, 8, and 9 are detail views illustrating the entrail-removing mechanism. Fig. 9 is a detail view showing the toothed disks of the cleaning mechanism.

My improvements are supported on a frame comprising horizontal members 1, connected by uprights 2. A drive-shaft 3 is supported in suitable bearings in end uprights 2 at or near their juncture with the upper horizontal members 1 and may have motion transmitted thereto by any desired mechanism. (Not shown.) A small gear 4 is secured on drive-shaft 3 and meshes with larger gears 5 and 6, secured on crank-shaft 7 and shaft 8, respectively, mounted in uprights 2 above and below shaft 3. A force-pump 9 is supported on the rear end of the frame and has its plunger 10 connected by pitman 11 with crank-shaft 7 for operating the same.

On shaft 8 large sprocket-wheels 12 are secured at opposite sides of the frame and have mounted thereon endless-chain fish-conveyers 13, which are also mounted on idle sprocket-wheels 14, supported on a shaft secured to the uprights at the forward end of the frame. These fish-carriers comprise a series of parallel short metal bars 14ª at each side, having holes in their ends to receive transverse pins 15, each alternate pair of bars bent toward each other at their ends, so as to fit between the ends of the adjacent bars, and small rollers 16 are mounted between the bars 14 to roll upon a platform 17, so as to reduce the friction and make the carrier run smooth. The inner bars 14ª are flanged, as shown at 18, and have secured thereon U-shaped receptacles 19 for the fish and are composed, preferably, of sheet metal bent to the shape desired and more clearly shown in Figs. 5 and 6, a separate series of receptacles being provided on each set of bars 14ª, so as not to interfere with the flexibility of the chain. The gear 6 also meshes with a small gear 21 on a short shaft mounted in one side of the frame and carrying a large pulley 22, connected with a smaller pulley 23 by a belt 24. This pulley 23 is secured on a transverse shaft 25, located about midway the ends of the frame and having adjustably secured thereon, by means of set-screws, sharp-toothed cutters 26, located on both sides of both fish-carriers and mounted to revolve between bars 27 to insure a clean cut and adapted to cut off the heads and tails of the fish presented to the cutters by the carriers, and a balance-wheel 27ª is located on the end of this shaft 25 to steady the cutters.

On each side of the frame brackets 28 are secured and carry parallel bars 29, between which a series of overlapping light wheels 30 are mounted to revolve and adapted to bear down on the fish and hold them in the carrier when passing the cutters and cleaning mechanism, which will now be described. In Fig. 2 the bars 29 are shown broken, and some of the wheels 30 are omitted for clearness.

A sprocket-wheel 31 is secured centrally on shaft 25 and is connected by a sprocket-chain 32 with another sprocket-wheel 33 on a shaft 34, supported in bearings at the upper ends of standards 34ª on the frame and located about midway between shaft 25 and the rear end of the frame. On shaft 34 on opposite sides of sprocket-wheel 33 beveled gears 35 are adjustably secured by set-screws and are adapted to transmit motion to the cleaners, and as the construction and operation of this part of my invention are precisely alike on both sides of the frame the below description of one side will apply alike to the other. Parallel slotted bars 36, bent at their ends, forming uprights to elevate the bars, are secured on the frame and are adapted to support the cleaner-carrying frames 37, as will now be explained. These cleaner-frames each comprise upper bar 38, a lower bar 39, and connecting brace-rods 40, the upper bar being longer than the lower bar and supported on bars 36 and provided with set-screws 41, projecting through the slots in said bars and having nuts on their lower ends to permit the clamping of the frame 37 at the proper position, according to the size of the fish to be cleaned.

In the frame 37 a series of parallel vertical shafts 43 are supported and made with intermeshing gears 44, and each carries a cleaner comprising a series of toothed disks 45, having interposed washers 46 of less diameter than the disks to permit the latter to overlap and draw the entrails from the fish when they are rapidly revolved, and toothed combs 47$^a$ are secured on lower bar 39, with the teeth thereof interposed between the disks 45, so as to effectually remove any entrails which may cling thereto, and hence always leave the disks clean when the next fish is presented thereto, and wires or rods 47$^b$ are secured on the frame between the carriers and cleaners to prevent the latter from pulling the fish from their receptacles and grinding them to pieces. On one of each pair of shafts 43, which projects above bar 38, a gear 38$^a$ is secured and meshes with the corresponding gear of the next pair of shafts, and one of said shafts has a large beveled gear 47 thereon to mesh with gear 35 and transmit motion to all of the cleaners.

The force-pump 9, above referred to, is provided with a dome 48, with which a main 49 communicates, and extends along the center of the frame and is provided on opposite sides with nozzles or spouts 50 to discharge the water against and into the fish to clean them and assist in removing the entrails, and boards or other deflectors are secured on the frame beside the carriers to prevent the water being discharged over the sides of the apparatus.

Suitable tables 51 are provided alongside of each carrier on which fish may be piled preparatory to being supplied to the carrier by the boys or other help, and a box or sluice 52 is located in the bottom of the frame to catch the heads, tails, and entrails of the fish and from which box the refuse can be readily removed.

To prevent the carriers from sagging and the rattling and wear incident thereto, I provide a track 53, suspended from the frame on rods 54 and which affords a runway for the rollers of the carrier, hence reducing the friction and lengthening the life of the apparatus.

On the table at one side of each carrier an adjustable gage 55 is provided, against which the heads of the fish can be placed to insure their being cut properly, and these gages 55 can be quickly adjusted according to the size of the fish to be cut and cleaned.

In operation boys or other help stand beside the tables at each side of the apparatus and place the fish in the receptacles as the carrier moves forward, placing the heads all one way. This work can be done very rapidly, owing to the fact that the fish will drop into the receptacle in proper position, and the gage 55 will serve to insure their being placed properly. The carrier first presents the fish to the cutters, which severs their heads and tails, and they are next encountered by the streams of water ejected through nozzles 50, which serves to slightly dislodge their entrails, and as they move along a little farther the toothed cleaner-disks 45 catch the entrails and draw them from the fish, the nozzles still playing on the fish to effectually clean them and remove any small particles of refuse not pulled out by the cleaner-disks 45. The fish are then carried over the rear sprocket-wheels 12 and dropped into a suitable receptacle or onto a conveyer for further treatment.

It will be seen that with my improvements the fish can be cleaned very rapidly, the only limit to the capacity of the apparatus being the rapidity with which fish can be fed to the carriers, and this can be governed by the length of the carriers and the number of help employed, or I might employ some automatic mechanism for supplying the fish to the carriers to increase the capacity of the machine and reduce the cost.

Instead of employing a force-pump I might connect the water-main with a suitable reservoir or other source of supply, this being governed by the location of the apparatus and the facilities for water.

It will also be seen that with my improvements the apparatus can be quickly adjusted for different sizes of fish, and, if desired, I might employ only one or more than two carriers and operating mechanism, the size of the apparatus being practically unlimited. I might also provide cleaning-gear on both sides of the carriers, so as to permit the fish to be placed in the carriers either way, some heads one way and the others turned with their heads in the opposite direction.

Various other slight changes and alterations might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. An apparatus for preparing fish, comprising means for cutting off the heads and tails of the fish, means for cleaning the fish and a single feeding apparatus coöperating with said means.

2. In a fish cutting and cleaning apparatus, the combination with a fish-carrier, of cutters on both sides of the carrier to sever the heads and tails of the fish, devices alongside the said carrier and behind the cutters for removing the entrails of the fish and means coöperating with said cutters and devices for operating them.

3. In a fish cutting and cleaning apparatus, the combination with a fish-carrier, of revolving cutters on both sides of the carrier to sever the heads and tails of the fish, and revolving toothed cleaning-disks alongside the said carrier and behind the cutters for removing the entrails from the fish and means coöperating with said cutters and disks to operate them.

4. In a fish cutting and cleaning apparatus, the combination with a fish-carrier, of cutters for severing the heads and tails of the fish, means for removing the entrails of the fish and means for washing the fish and means coöperating with said cutters and removing means, to operate them.

5. In a fish cutting and cleaning apparatus, the combination with a fish-carrier, of revolving cutters on both sides of said carrier for severing the heads and tails from the fish, revolving overlapping toothed cleaning-disks for removing the entrails from the fish, and means for directing a stream of water upon and into the fish.

6. In a fish cutting and cleaning apparatus, the combination with a fish-carrier, of means for severing the heads and tails from the fish, revolving overlapping toothed cleaning-disks for removing the entrails from the fish, toothed combs for cleaning said disks and means for directing streams of water upon the fish.

7. In a fish cutting and cleaning apparatus, the combination with a fish-carrier, of cutters on both sides of the carrier for severing the heads and tails from the fish, a pump, means for operating said devices, a pipe communicating with the pump and nozzles on the side of the pipe for discharging against the fish in the fish-carrier.

8. In a fish cutting and cleaning apparatus, the combination with a frame, of an endless chain mounted thereon, U-shaped fish-receptacles on said chain, a cutter on each side of the chain to cut off the heads and tails of the fish, devices on the frame for removing the entrails from the fish and mechanism coöperating with said chain cutters and removing devices for operating them simultaneously.

9. In a fish cutting and cleaning apparatus, the combination with a frame, of sprocket-wheels at the respective ends of the frame, an endless chain on said wheels, receptacles on said chain to hold the fish transversely across the chain, rotary disk cutters on both sides of the chain for cutting off the heads and tails of the fish, revolving horizontally-disposed toothed cleaning-disks adapted to tear the entrails from the fish, and means for discharging streams of water upon the fish.

10. In an apparatus for cutting and cleaning fish, the combination with a frame, of an endless chain mounted on sprocket-wheels, a platform, rollers on the chain to run on the platform, a suspended track on which the lower portion of the chain runs, U-shaped transverse receptacles on said chain, cutters on both sides of the chain for cutting off the heads and tails of the fish, and means behind the cutters for cleaning the fish.

11. In a fish cutting and cleaning apparatus, the combination with a fish-carrier, of cutters for cutting off the heads and tails of the fish, an adjustable frame, parallel shafts on the frame having intermeshing gears, toothed intercurrent disks on said shafts adapted to pull the entrails from the fish, means for transmitting motion to all of said shafts and means for directing streams of water into the fish.

12. In a fish cutting and cleaning apparatus, the combination with an endless chain, of U-shaped fish-receptacles on said chain, wheels for holding the fish in the receptacles, cutters for cutting off the heads and tails of the fish, and means for directing streams of water into the fish.

13. In a fish cutting and cleaning apparatus, the combination with a frame, of a pump on the frame, means for operating the pump, a fish-carrier, means for moving the fish-carrier, cutters for cutting off the heads and tails of the fish, means for pulling the entrails from the fish and a pipe connected to said pump and adapted to direct the water into the fish.

14. In a fish cutting and cleaning apparatus, the combination with an endless chain, of U-shaped transversely-disposed fish-receptacles on said chain, cutters for cutting off the heads and tails of the fish, revolving horizontally-disposed toothed disks for tearing the entrails from the fish, and wires or rods interposed between the disks and carrier to prevent the fish being pulled from the receptacles.

In testimony whereof I have signed this specification in the presence of two subscribing witnesses.

ARTHUR R. ROGERS

Witnesses:
ALTON V. ROGERS,
CLIFTON M. ROGERS.